July 18, 1950 J. M. DAVIES ET AL 2,515,552
TRACTOR LUBRICATION
Filed Dec. 21, 1945 4 Sheets-Sheet 1
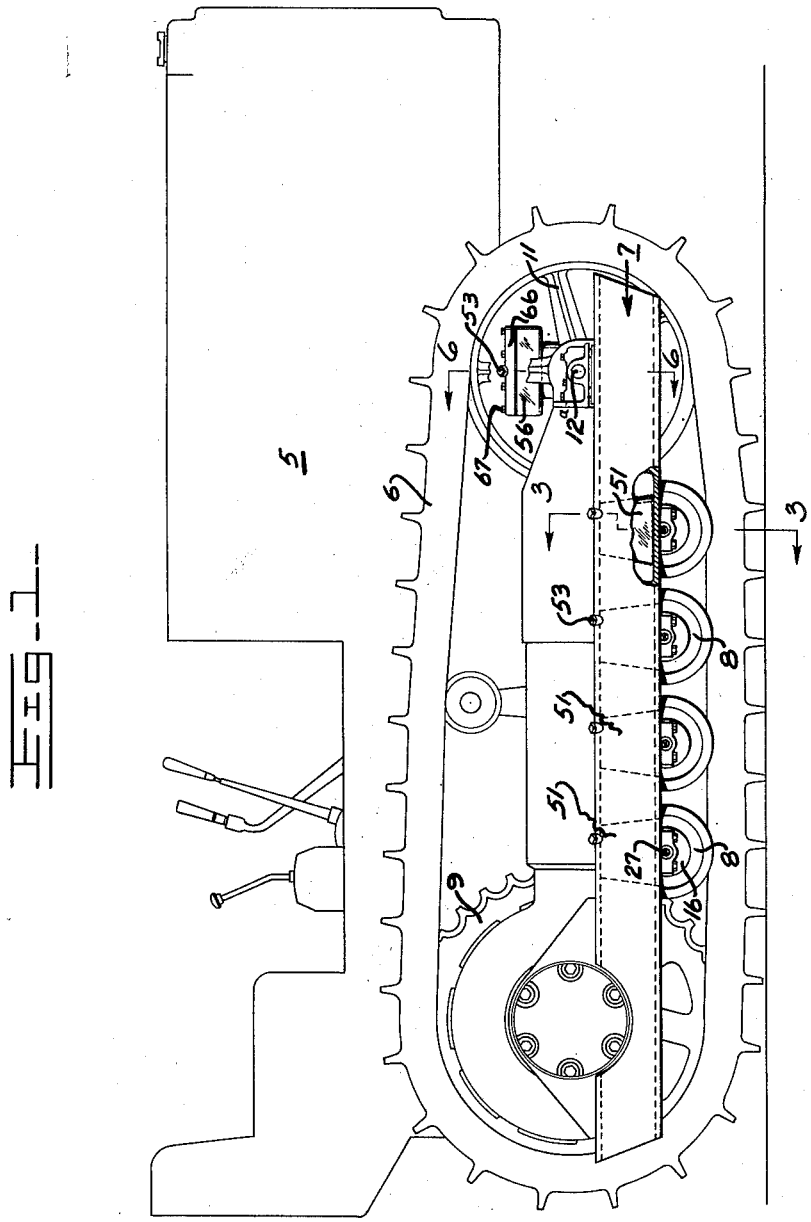
INVENTORS.
JAMES M. DAVIES
JOHN L. DEFFENBAUGH
BY Charles M. Fryer
ATTORNEY.

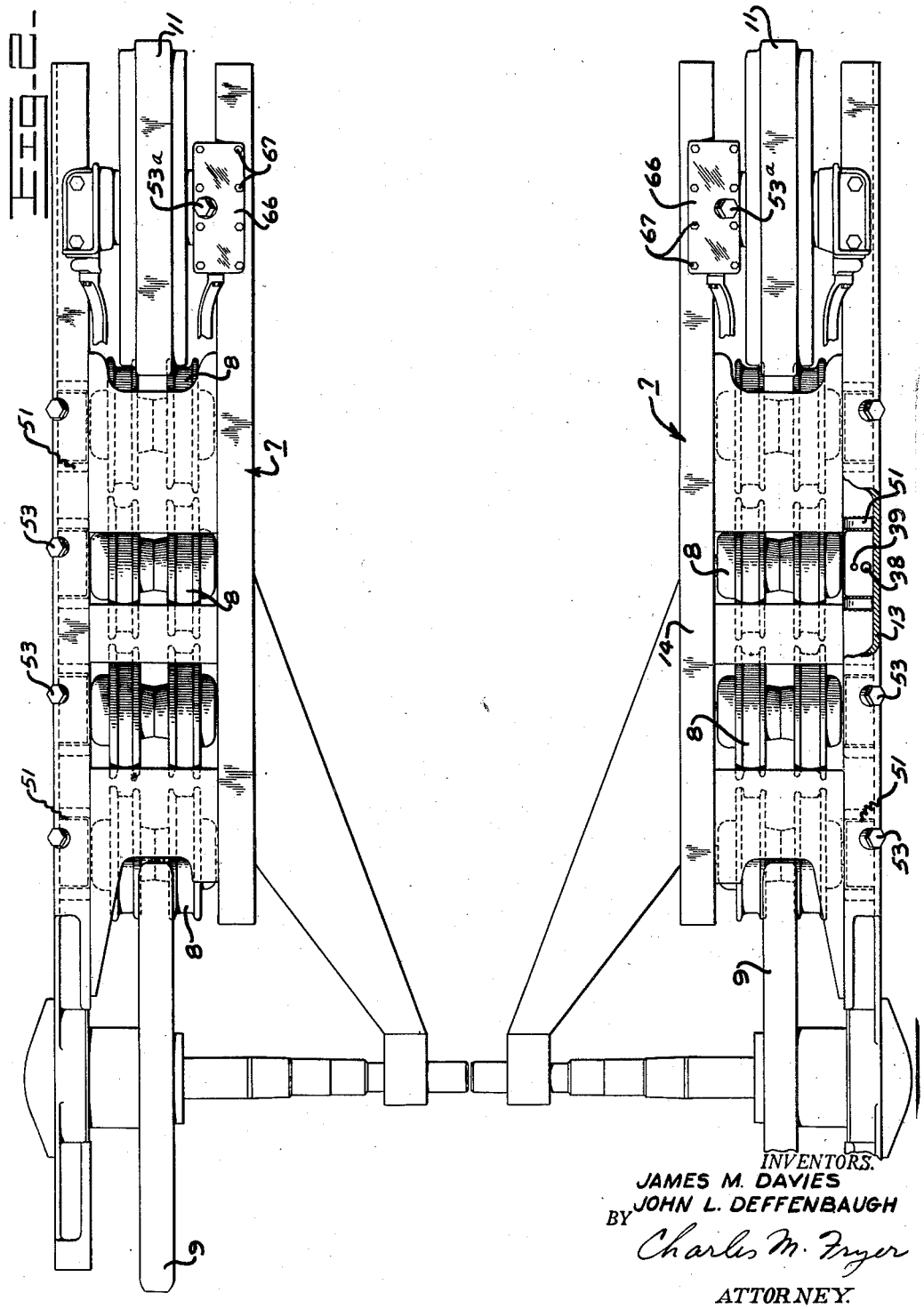

July 18, 1950 J. M. DAVIES ET AL 2,515,552
TRACTOR LUBRICATION
Filed Dec. 21, 1945 4 Sheets-Sheet 3
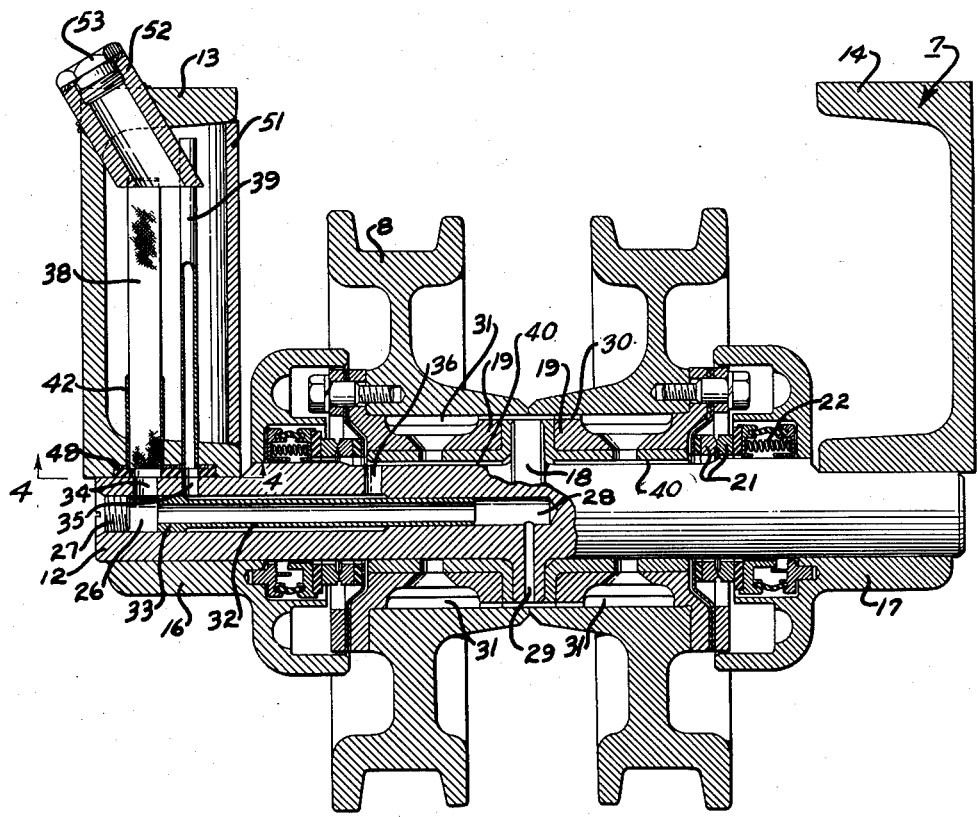
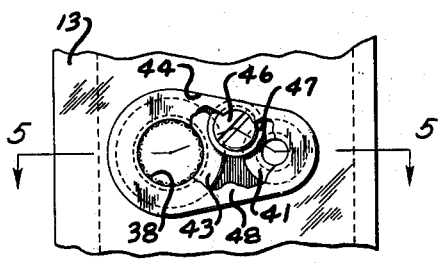
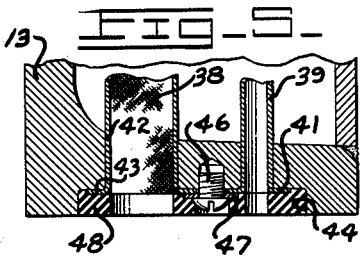
INVENTORS.
JAMES M. DAVIES
JOHN L. DEFFENBAUGH
BY Charles M. Fryer
ATTORNEY.

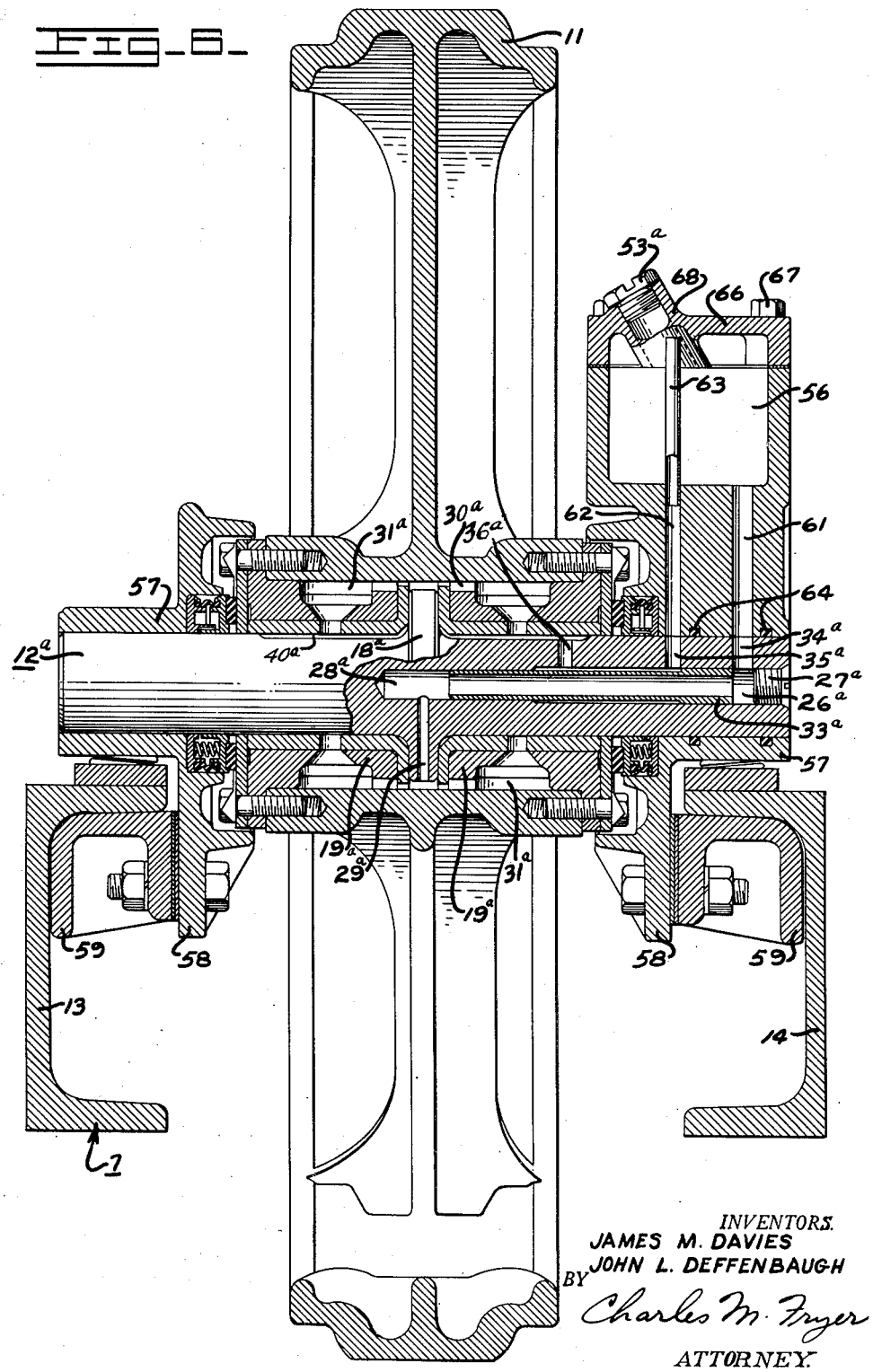

Patented July 18, 1950

2,515,552

UNITED STATES PATENT OFFICE 2,515,552

TRACTOR LUBRICATION

James M. Davies and John L. Deffenbaugh, Peoria, Ill., assignors to Caterpillar Tractor Co., San Leandro, Calif., a corporation of California Application December 21, 1945, Serial No. 636,438

2 Claims. (Cl. 308—92)

The present invention relates to tractor lubrication and particularly to lubrication of the track rollers and main track idlers of a track type tractor.

In track-type tractors the endless tracks which engage the ground are driven by a pair of main sprockets geared to the tractor engine and usually disposed toward the rear of the tractor. Each track passes over a forwardly positioned or front idler and truck frames extend between the main sprockets and front idlers for each track. Track rollers are supported by these track frames to guide and support the track where it contacts the ground to support the weight of the tractor. The front idlers and track rollers rotate on stationary shafts which are supported on the truck frames. Lubrication of the track roller and idler bearings which are subjected to heavy duty constitutes a problem which is aggravated by the fact that the bearings are located in close proximity to the ground and are therefore surrounded by dust, sand, mud or any other abrasive substances in which the tractor may be operating.

It is an object of the present invention to provide means for supplying an abundance of clean lubricant to track rollers and idler bearings of a track-type tractor, to provide reservoirs for each bearing of sufficient capacity to obviate the necessity of frequent replenishment of the lubricant and to dispose such reservoirs in positions adequately protected from damage during the operation of the tractor. Further and more specific objects and advantages of the invention are made apparent in the following specification wherein a preferred form of the invention is disclosed by reference to the accompanying drawings.

In the drawings:

Fig. 1 is a side elevation of a track type tractor illustrating the relative positions of the front idler, the track rollers and the lubricant reservoirs of the present invention;

Fig. 2 is a plan view with parts in section of the truck frames of the tractor illustrated in Fig. 1;

Fig. 3 is an enlarged transverse sectional view through one of the truck frames taken on the line 3—3 of Fig. 1;

Fig. 4 is an enlarged fragmentary view taken on the line 4—4 of Fig. 3;

Fig. 5 is a section taken on the line 5—5 of Fig. 4; and

Fig. 6 is an enlarged vertical transverse section through a front idler taken on the line 6—6 of Fig. 1.

Fig. 1 diagrammatically illustrates a tractor 5 having tracks 6 and a truck frame assembly 7 upon which are mounted track rollers 8. One end of the truck frame assembly 7 is pivotally supported with relation to the axis of a driving sprocket 9 and the front idler 11 is mounted at the opposite end of the truck frame assembly.

Each of the track rollers 8 comprises, as illustrated in Fig. 3, a pair of wheel like members joined as by welding to their aligned hubs. The truck frames upon which they are mounted are made up of a pair of opposed channel shaped members 13 and 14 and each track roller is supported on a stationary shaft 12 which is secured to the bottom surfaces of the channels 13 and 14 as by collars 16 and 17, respectively. The shaft 12 is provided with a centrally disposed integrally formed thrust collar 18 which separates a pair of bearings 19 which are disposed within and secured to the hub of the roller 8 and rotatable with relation to the shaft 12. Lubricant seals illustrated at 21 are disposed at opposite ends of the bearing assembly and are maintained under pressure of resilient thrust members indicated at 22. The lubricant seals and thrust members, which are of conventional construction, serve to prevent the escape of lubricant from the interior of the hub where the bearings are disposed, as well as to prevent the entrance of foreign matter into the bearing area.

The purpose of the present invention is to provide an abundant supply of clean lubricant to the interior of the roller hubs where the bearings are disposed. In order to accomplish this, one end of the shaft 12 is provided with an axial bore 26 adapted to be closed as by a threaded plug 27. The bore 26 communicates with a somewhat smaller concentric bore 28 which extends to or just beyond the center of the shaft or to within the vicinity of the thrust collar 18. A radial passage 29 extends through the thrust collar and communicates between the end of the bore 28 and the interior of the hub wherein spaces indicated at 31, interconnected as by passages 30 and 40, constitute a lubricant reservoir which contains the bearings 19. A sleeve 32 having an enlarged portion 33 at one end thereof is pressed into the axial bore of the shaft 12 with its smaller end fitting in the bore 28 and its enlarged end 33 closely fitting the interior of the bore 26 and located between a pair of radial apertures 34 and 35 in the shaft 12. The radial aperture 34 thus provides an inlet for lubricant which is free to flow through the sleeve 32 and then through the bore 28 and radial bore 29 to the interior of the track roller hub. A radial bore 36 in the shaft 12 forms a communication between the interior of the hub and the annular space between the bore 26 and the sleeve 32 so that fluid within the hub is free to pass out through the bore 36, then through such annular space and out through the aperture 35.

A tubular strainer or filter 38 is mounted in the frame member 13 and communicates with the inlet aperture 34. A stand pipe 39 is similarly mounted in the frame member and communicates with the aperture 35. The stand pipe 39 has a flange 41 at its lower end, as best illustrated in Figs. 4 and 5, and the filter 38 is mounted in a sleeve 42 having a similar bottom flange 43. The sleeve 42 and stand pipe 39 are disposed with their respective flanges in a suitable recess 44 in the bottom of the frame member 13 and extend upwardly through perforations in the frame member provided for their reception. Both the sleeve 42 and stand pipe 39 may be held in place by single set screw 46 having a washer 47 overlapping the edges of their respective flanges. A sealing member illustrated as a rubber gasket 48 may be inserted in the recess 44 to form a seal between the shaft 12 and the frame member 13.

A lubricant reservoir 51 is provided inside the channel member 13 for each track roller assembly and is preferably constructed by bending a flat plate to a U shape and welding such plate into the channel of the frame member 13 to form three sides of a substantially rectangular reservoir, the other three sides of which are formed by the web and flanges of the frame member 13. The disposition and shape of such reservoirs are best illustrated in Figs. 1 and 2.

A suitable aperture may be provided in the frame member for the reception of a filling spout 52 for each of the reservoirs 51 with plugs 53 serving as closure members therefor. The lubricant reservoirs thus provided are exceptionally sturdy in construction and are disposed in a space which is otherwise unoccupied and which is well protected from damage as the tractor advances over rough ground or encounters obstacles which strike against the sides of the frame members 13. Furthermore, each track roller assembly is provided with an individual reservoir of sufficient size to supply lubricant in abundance and upon failure of the lubricant seal, or other accident permitting escape of lubricant from any track roller, all of the other rollers continue to be well lubricated.

In operation lubricant is supplied to the reservoirs 51 through the filler spouts 52 and, as is apparent from Fig. 3 of the drawings, lubricant entering the reservoir 51 will pass through the filter 38 and aperture 34 into the bore 26 and then through sleeve 32, bore 28 and radial bore 29 to the reservoir 31 within the hub. The radial bore 29 communicates with the reservoir 31 adjacent its bottom so that upon the introduction of lubricant any air contained in the reservoir 31 is free to pass outwardly through the aperture 36 and eventually up through the stand pipe 39 to be released into the reservoir 51 above the point of entry of lubricant through the filler spout 52. As the end of the stand pipe 39 terminates at a point higher than the bottom of the filler spout 52, there is no danger of lubricant flowing into the stand pipe which vents air from the vicinity of the bearings.

The sleeve 42 which supports the filter 38 is imperforate and is illustrated as extending a substantial distance above the bottom of the reservoir 51. Thus, lubricant in the bottom of the reservoir will not flow through the filter 38 and the bottom of the reservoir constitutes a sediment trap for the collection of solid foreign substances such as any particles of scale which may form on the interior of the reservoir 51 during welding.

As the filler spout 52 extends into the reservoir to a point below the top wall thereof an air lock is provided which prevents complete filling of the reservoir with liquid and provides an air space to accommodate any expansion or contraction of the liquid which might take place during operation of the tractor. Thus, such expansion and contraction will not result in differential pressures sufficient to break the seals 21 through which lubricant might be lost or through which foreign abrasive substances might be introduced to the lubricant reservoir 31 which contains the bearings.

In Fig. 6 of the drawings a lubrication system similar to that hereinabove disclosed is illustrated as applied to the main idler 11. As many parts of the main idler bearing assembly are similar or identical with the track roller bearing assemblies, the corresponding parts will be referred to by the same reference characters as heretofore used followed by the suffix character "a". As the shaft 12a upon which the idler 11 is mounted is disposed above the frame members 13 and 14, it is provided with a lubricant reservoir 56 formed as a casting which may be made as an integral part of one of a pair of collars 57 which support the shaft 12a. The collars 57 are shown as having extensions 58 to which are secured adjustable guides 59 which fit within the frame members 13 and 14 and serve to permit longitudinal sliding or adjustment of the front idler with respect to the truck frame assembly 7. A passage 61 communicates between the interior of the reservoir 56 and aperture 34 in the shaft 12a and a passage 62 communicates with a stand pipe 63 corresponding to the stand pipe 39 hereinbefore described. Resilient sealing rings 64 may be disposed between the shaft 12a and the collar 57 to prevent the escape of lubricant at this point. The reservoir 56 has a cover 66 secured in place thereon as by cap screws 67 and a filler spout 68, which in this case may be formed integrally with the cover 66, is closed by the plug 53a. A filter corresponding to the filter 38 may be used in conjunction with the passage 61 but as the reservoir 56 has a removable cover which permits access to the interior thereof for cleaning purposes, the filter may be omitted, as shown, if desired.

In the case of track roller reservoirs 51, it is preferable that they be disposed in the outer truck frame member 13 or on the side of the truck frame away from the tractor to provide convenient access for filling them through the spouts 52. In the case of the front idler reservoir 56, however, this position is desirably reversed as the casting of which the reservoir is formed is best protected from breakage by being disposed between the idler and the main frame of the tractor. Disposed in this position the filler spout of the reservoir 56 is, however, readily accessible through the space between the spokes of the idler.

The invention herein disclosed provides an individual adequate supply of lubricant for each of the track rollers as well as the front idlers of a track type tractor for a long period of time and the lubricant reservoirs are all positioned both conveniently and safely in areas which are not otherwise occupied and wherein they do not interfere either with operation or assembly of the various parts of the tractor.

We claim:

1. Apparatus for lubricating a roller or the like which rotates about a stationary shaft and which has a hollow hub portion embracing the shaft and enclosing bearings engageable with the shaft which comprises a lubricant reservoir, an axial bore in the shaft, two radially disposed apertures in the shaft communicating between the reservoir and said bore, two radial bores communicating between the axial bore and the said hollow hub portion, and a sleeve member in the axial bore separating it into two passages each of which connects one of said apertures with one of said radial bores.

2. Apparatus for lubricating the track rollers of a track-type tractor or the like wherein the roller has a hollow hub containing bearings and is mounted for rotation on a stationary shaft which comprises concentric passages in said shaft to form a lubricant passage and a vent passage, radial bores in the shaft communicating between the hollow hub and said passages, and radial apertures adjacent an end of the shaft communicating one with each of the passages to form a vent and a means to introduce lubricant.

JAMES M. DAVIES.
JOHN L. DEFFENBAUGH.

REFERENCES CITED

The following references are of record in the file of this patent:

UNITED STATES PATENTS

| Number | Name | Date |
|---|---|---|
| 2,237,921 | Baker | Apr. 8, 1941 |
| 2,283,871 | Norelius | May 19, 1942 |
| 2,419,955 | Knox | May 6, 1947 |
| 1,642,979 | Timbs | Sept. 20, 1947 |

FOREIGN PATENTS

| Number | Country | Date |
|---|---|---|
| 449,056 | Germany | Sept. 8, 1927 |